(12) United States Patent
Hsueh et al.

(10) Patent No.: US 8,112,439 B2
(45) Date of Patent: Feb. 7, 2012

(54) DATA PROCESSING METHOD AND SYSTEM CAPABLE OF REDUCING REQUIRED MEMORY

(75) Inventors: Ching-Wen Hsueh, Yilan County (TW); Ming-Yang Chao, Hsin-Chu Hsien (TW)

(73) Assignee: Mediatek Inc., Hsin-Chu (TW)

( * ) Notice: Subject to any disclaimer, the term of this patent is extended or adjusted under 35 U.S.C. 154(b) by 421 days.

(21) Appl. No.: 12/236,823

(22) Filed: Sep. 24, 2008

(65) Prior Publication Data
US 2010/0082668 A1   Apr. 1, 2010

(51) Int. Cl.
*G06F 7/00* (2006.01)
*G06F 17/30* (2006.01)

(52) U.S. Cl. .................................................... 707/770

(58) Field of Classification Search .......... 707/600–831; 711/2–4, 117–123, 147–149, 161–162; 369/13.56, 369/30.23, 47.1, 76, 86, 98, 102, 112.22, 369/124.01, 124.11, 124.15
See application file for complete search history.

(56) References Cited

U.S. PATENT DOCUMENTS

| | | | |
|---|---|---|---|
| 6,937,665 B1 * | 8/2005 | Vandenameele | 375/260 |
| 7,362,676 B2 * | 4/2008 | Chiang | 369/53.17 |
| 2006/0215707 A1 * | 9/2006 | Tsai et al. | 370/535 |
| 2007/0033302 A1 * | 2/2007 | Lin et al. | 710/22 |

OTHER PUBLICATIONS

Bjarnason et al., Reduced Memory Requirements for the S-Transform, Apr. 22-26, 2007, IEEE, 745-747.*

* cited by examiner

*Primary Examiner* — Jean B Fleurantin
(74) *Attorney, Agent, or Firm* — Thomas|Kayden (57) ABSTRACT

A data processing system is disclosed. The system includes a processor, a transformer, a first memory buffer, a second memory buffer, a first filter, and a second filter. An obtained transmission signal symbol is first transformed to first data. The first memory buffer stores the first data. The processor obtains peak data based on the first data according to a predetermined threshold. The transformer transforms the peak data to second data and stores the second data in the second memory buffer. The first filter filters the second data to determine reserved data of the second data and removes the reserved data from the second data to generate third data. The transformer transforms the third data to fourth data and stores the fourth data in the second memory buffer. The processor merges the first and fourth data to generate fifth data. The second filter filters the fifth data based on the transmission signal symbol and a previously obtained transmission signal symbol.

15 Claims, 8 Drawing Sheets

DATA PROCESSING METHOD AND SYSTEM CAPABLE OF REDUCING REQUIRED MEMORY

BACKGROUND OF THE INVENTION

1. Field of the Invention

The invention relates to memory control, and more particularly to a data processing method and system capable of reducing required memory.

2. Description of the Related Art

Orthogonal frequency division multiplexing (OFDM) uses multiple carriers to transmit data. The transmitted data is separated into multiple sub-carriers for parallel transmission, rather than being carried by only one carrier. Only a small amount of the data is transported on each sub-carrier, thus lowering the bit rate per sub-carrier. OFDM can be seen as a parallel data transmission and frequency division multiplexing technique (FDM). OFDM is a more robust against frequency selective fading and multi-path immunity.

OFDM is used for Terrestrial Digital TV broadcasting in Europe, Japan and Taiwan. In addition. OFDM is used in high-speed telephone line communications such as ADSL, and wireless LAN such as IEEE802.11a/g. Although OFDM has many advantages, it suffers from the serious defect of high Peak-to-average power ratio (PAPR). OFDM has peak higher than the average signal level because OFDM is comprised of thousands of orthogonal waves. The high peak defect results in serious problems such as nonlinear distortion and increased bit error rate (BER) at the receiver, next-channel Interference, and similar. A high-level transmitter, a high-resolution A/D and D/A converter, for example, is thus required to overcome these defects, increasing costs. Thus, discrete cosine transform (DCT) is applied to reduce PAPR, for reducing capital outlay required by OFDM.

Current PAPR reduction methods utilizing a windowing operation may require excessive storage for input data, time domain data, frequency domain data, and filtered data respectively, requiring more hardware cost. Thus, a data processing method and system capable of reducing required memory is desirable.

BRIEF SUMMARY OF THE INVENTION

The invention provides data processing methods capable of reducing required memory. An exemplary embodiment of a data processing method comprises the following. An obtained transmission signal symbol is transformed to first data and the first data is stored in a first memory buffer. Peak data is obtained based on the first data according to a predetermined threshold. The peak data is transformed to second data and the second data is stored in a second memory buffer. The second data is filtered to determine reserved data of the second data. The reserved data is removed from the second data to generate third data. The third data is transformed to fourth data and the fourth data is stored in a second memory buffer. The first and fourth data are merged to generate fifth data. The fifth data is filtered based on the transmission signal symbol and a previously obtained transmission signal symbol.

The invention further provides data processing systems capable of reducing required memory. An exemplary embodiment of a data processing system comprises a processor, a transformer, a first memory buffer, a second memory buffer, a first filter, and a second filter. An obtained transmission signal symbol is first transformed to first data. The first memory buffer stores the first data. The processor obtains peak data based on the first data according to a predetermined threshold. The transformer transforms the peak data to second data and stores the second data in the second memory buffer. The first filter filters the second data to determine reserved data of the second data and removes the reserved data from the second data to generate third data. The transformer transforms the third data to fourth data and stores the fourth data in the second memory buffer. The processor merges the first and fourth data to generate fifth data. The second filter filters the fifth data based on the transmission signal symbol and a previously obtained transmission signal symbol.

The invention further provides wireless devices capable of reducing required memory. An exemplary embodiment of a wireless device comprises a processing module, a transforming module, a first memory, a second memory, a first filtering module, and a second filtering module. An obtained transmission signal symbol is first transformed to first data. The first memory stores the first data. The processing module obtains peak data based on the first data according to a predetermined threshold. The transforming module transforms the peak data to second data and stores the second data in the second memory. The first filtering module filters the second data to determine reserved data of the second data and removes the reserved data from the second data to generate third data. The transforming module transforms the third data to fourth data and stores the fourth data in the second memory buffer. The processing module merges the first and fourth data to generate fifth data. The second filtering module filters the fifth data based on the transmission signal symbol and a previously obtained transmission signal symbol.

The invention further provides wireless communication systems. An exemplary embodiment of a wireless communication system comprises a processing module, a transforming module, a first memory, a second memory, a first filtering module, and a second filtering module. An obtained transmission signal symbol is first transformed to first data. The first memory stores the first data. The processing module obtains peak data based on the first data according to a predetermined threshold. The transforming module transforms the peak data to second data and stores the second data in the second memory. The first filtering module filters the second data to determine reserved data of the second data and removes the reserved data from the second data to generate third data. The transforming module transforms the third data to fourth data and stores the fourth data in the second memory. The processing module merges the first and fourth data to generate fifth data. The second filtering module filters the fifth data based on the transmission signal symbol and a previously obtained transmission signal symbol.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Several exemplary embodiments of the invention are described with reference to FIGS. 1 through 8, which generally relate to data processing capable of reducing required memory. It is to be understood that the following disclosure provides various different embodiments as examples for implementing different features of the invention. Specific examples of components and arrangements are described in the following to simplify the present disclosure. These are merely examples and are not intended to be limiting. In addition, the present disclosure may repeat reference numerals and/or letters in the various examples. This repetition is for the purpose of simplicity and clarity and does not in itself dictate a relationship between the various described embodiments and/or configurations.

The invention discloses a data processing method and system capable of reducing required memory.

Figure 1:
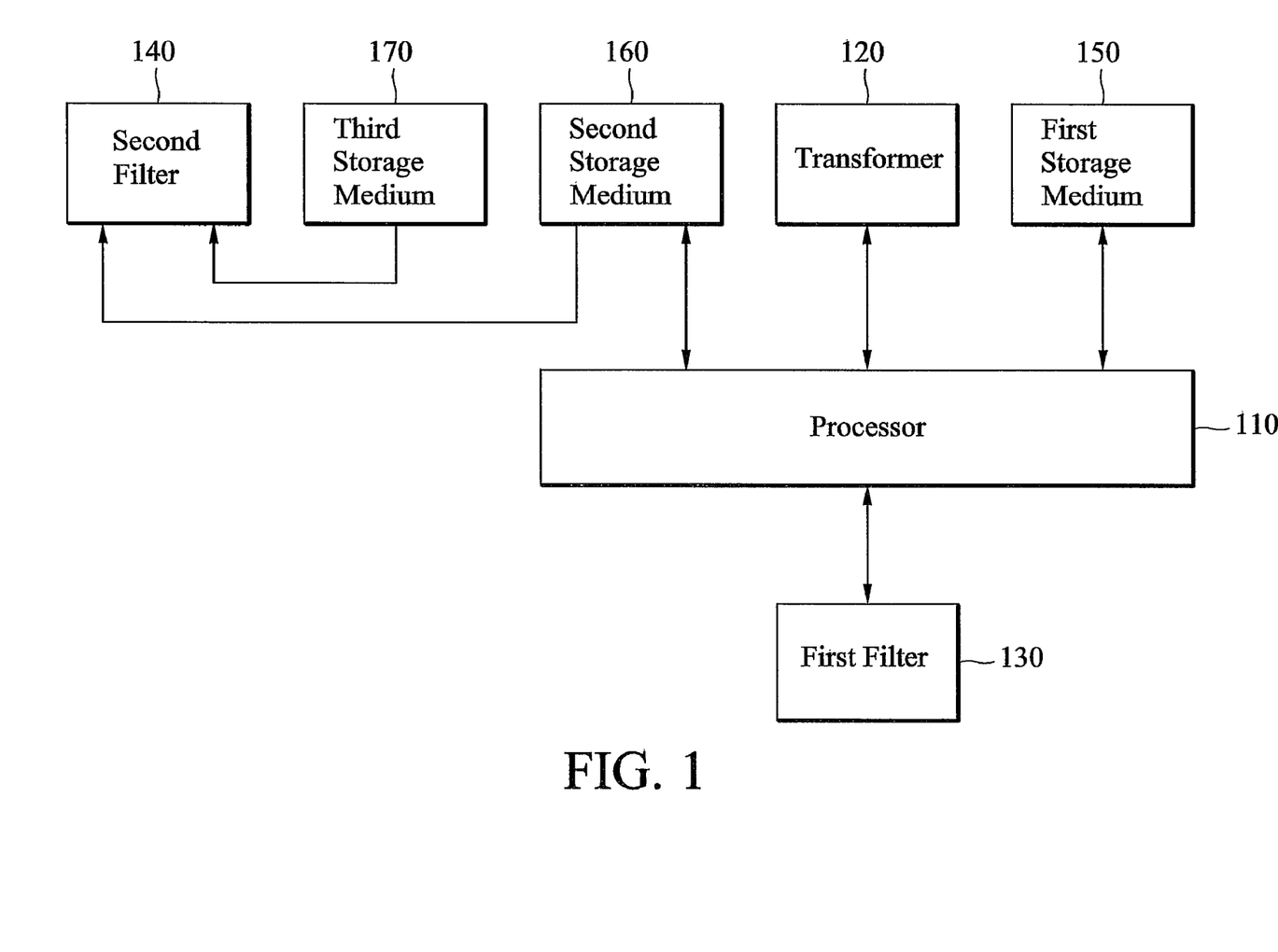
FIG. 1 is a schematic view of an embodiment of a data processing system capable of reducing required memory.
Figure 2:
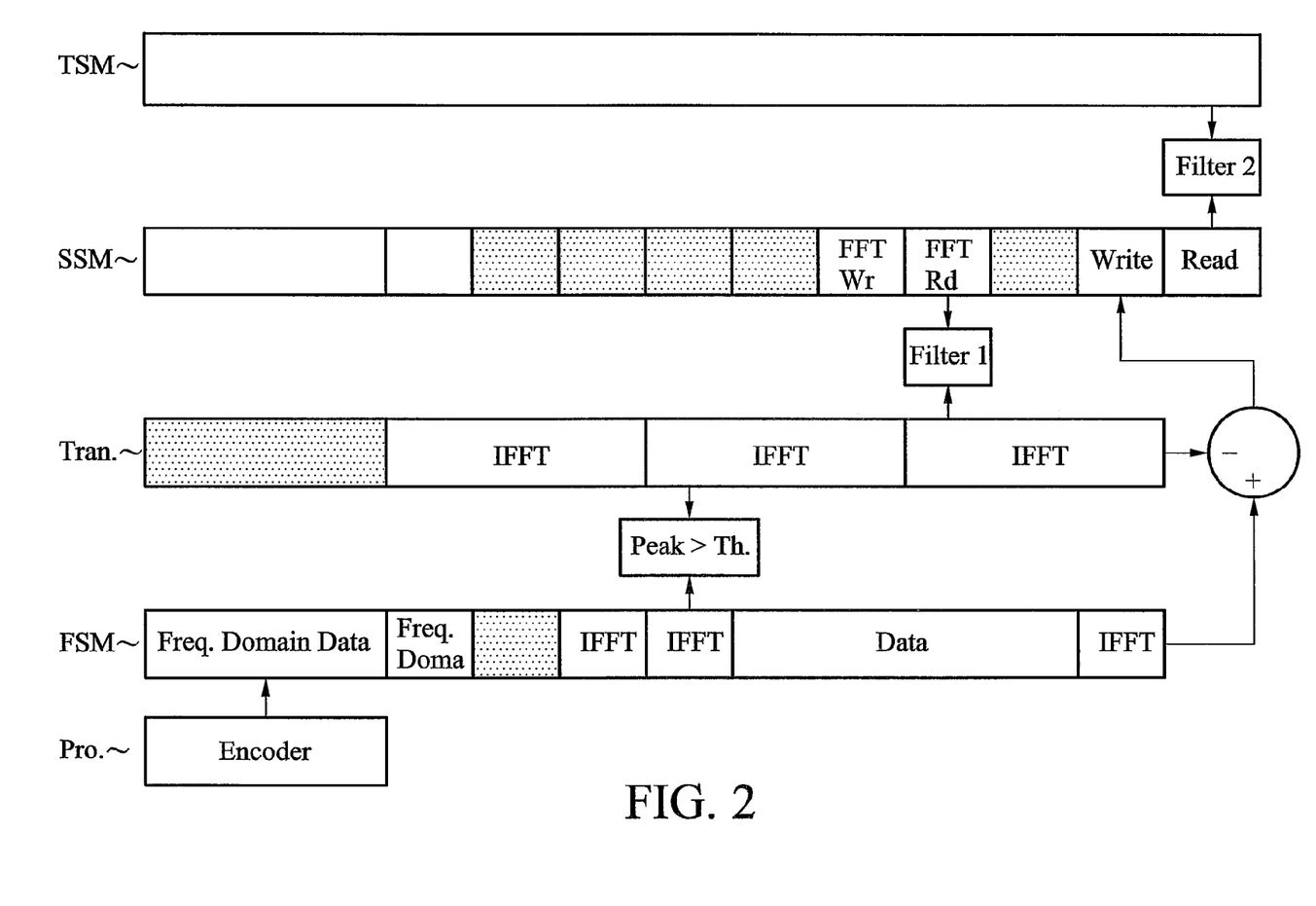
FIG. 2 is a workflow of an embodiment of a data processing using the system shown in FIG. 1.

FIG. 1 is a schematic view of an embodiment of a data processing system capable of reducing required memory. The system comprises a processor 110, a transformer 120, a first filter 130, a second filter 140, a first storage medium, 150, a second storage medium 160, and a third storage medium 170. Processor 110 may be an encoder. Transformer 120 can perform fast Fourier transform (FFT) and inverse fast Fourier transform (IFFT). FIG. 2 is a workflow of an embodiment of a data processing using the system shown in FIG. 1.

Figure 6:
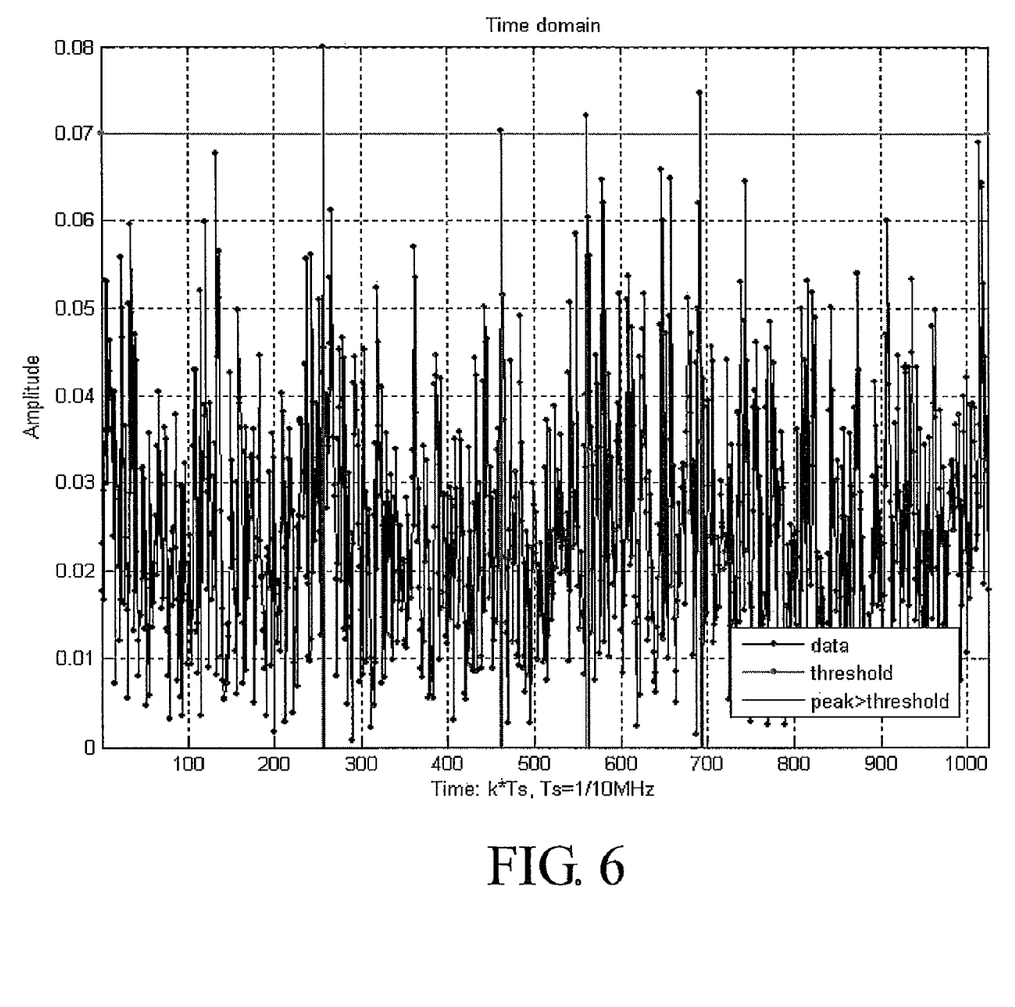
FIG. 6 is a schematic view of an embodiment of transforming frequency domain data to time domain data.

Referring to FIGS. 1 and 2, a processor 110 (Pro 110), such as an encoder, receives and transforms transmission signal data (an OFDM symbol to frequency domain data and stores the frequency domain data in first storage medium (FSM) 150. Next, transformer (Tran.) 120 reads the frequency domain data from first storage medium 150 and implements IFFT thereon, transforming the frequency domain data to time domain data (as shown by the chart in FIG. 6) and storing the time domain data in first storage medium 150. Next, processor 110 locates peaks shown in FIG. 6 based on a predefined threshold value (Peak >Th.) and transmits the located peak data to transformer 120. As shown in FIG. 6, peaks with red lines are greater than the predetermined threshold value (0.07). Note that the time domain data shown in FIG. 6 is reserved in first storage medium 150 for subsequent comparison.

Figure 7:
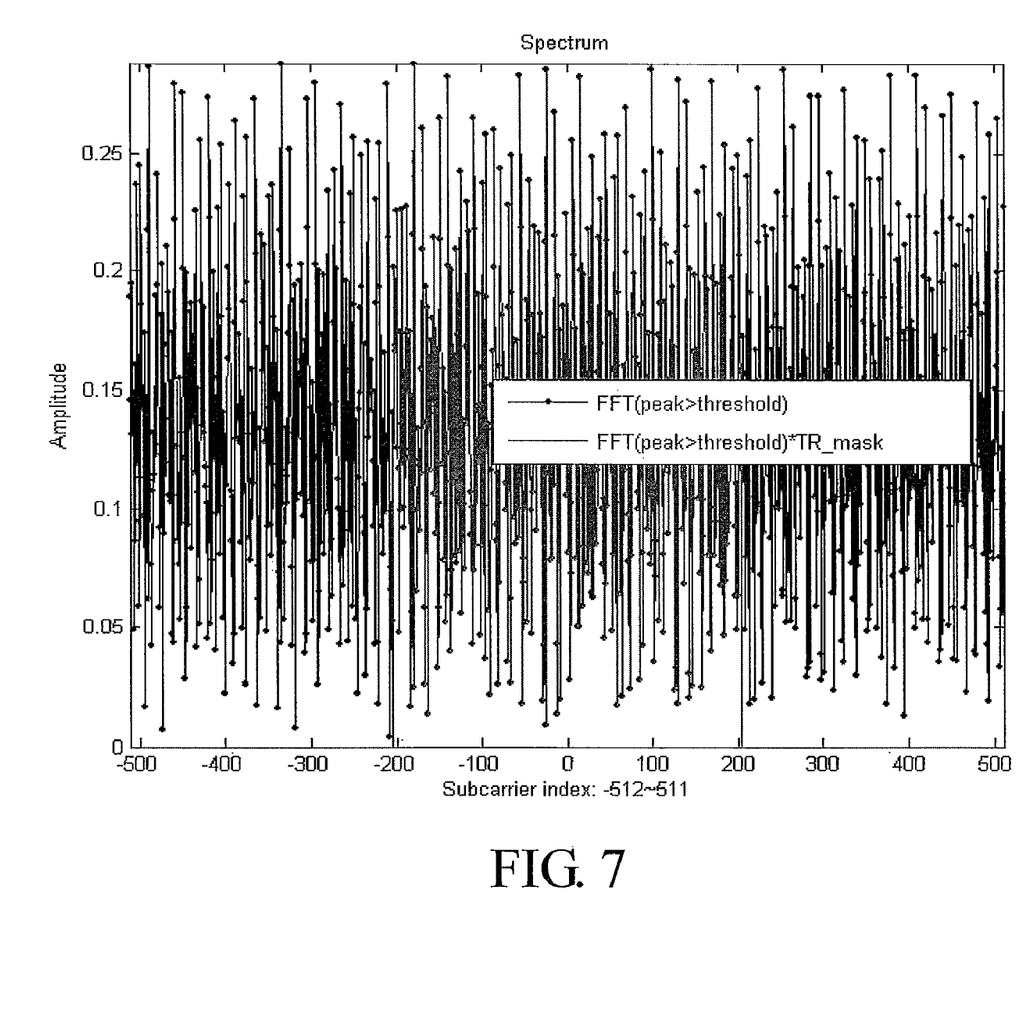
FIG. 7 is a schematic view of an embodiment of transforming the time domain data to the frequency domain data.

Next, transformer 120 implements FFT on the located peak data, transforming the time domain data to frequency domain data (as shown by the chart in FIG. 7) and storing the frequency domain data in second storage medium (SSM) 160. First filter (Filter 1) 130 reads the frequency domain data and implements spectrum masking thereon to locate reserved tones, setting data tone to 0. Referring to FIG. 7, the red zone in the chart is the masking result and should be reserved. Next, first filter 130 transmits the filtered peak data to transformer 120. Transformer 120 implements IFFT on the filtered peak data, transforming the frequency domain data to time domain data.

Figure 8:
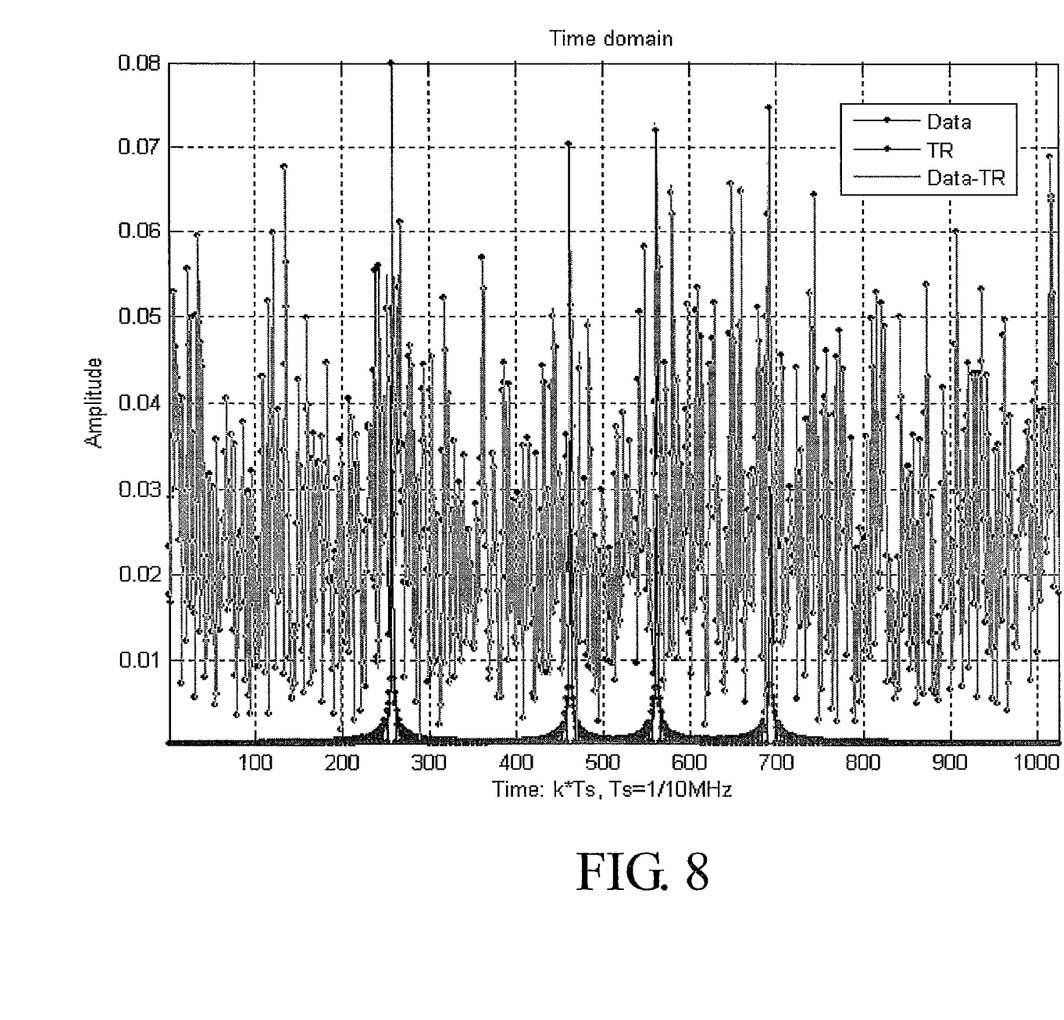
FIG. 8 is a schematic view of an embodiment of merge result of the time domain data and the frequency domain data.

The masked peak data (time domain data) and the original time domain data shown in FIG. 6 are merged, resulting in each peak being less than the predetermined threshold value. Referring to FIG. 8, green peak data is the merge result, in which each peak is less than the predetermined threshold value, and is stored in second storage medium 160. Further, a windowing operation is required to suppress side lobes using a raised cosine filter, reducing influence on other transmission signals while orthogonal frequency division multiple access (OFDMA) is performed. Thus, second filter 140 (Filter 2) accesses the filter peak data stored in first filter 130 and the previously processed transmission signal data (the previous OFDM symbol) stored in third storage medium 170 (TSM) and implements a raised cosine operation in response to transmission signal data. Second filter 140 may be a raised cosine filter.

As described, PAPR reduction and windowing operations may be performed using only three storage mediums, thus reducing hardware cost.

Figure 3:
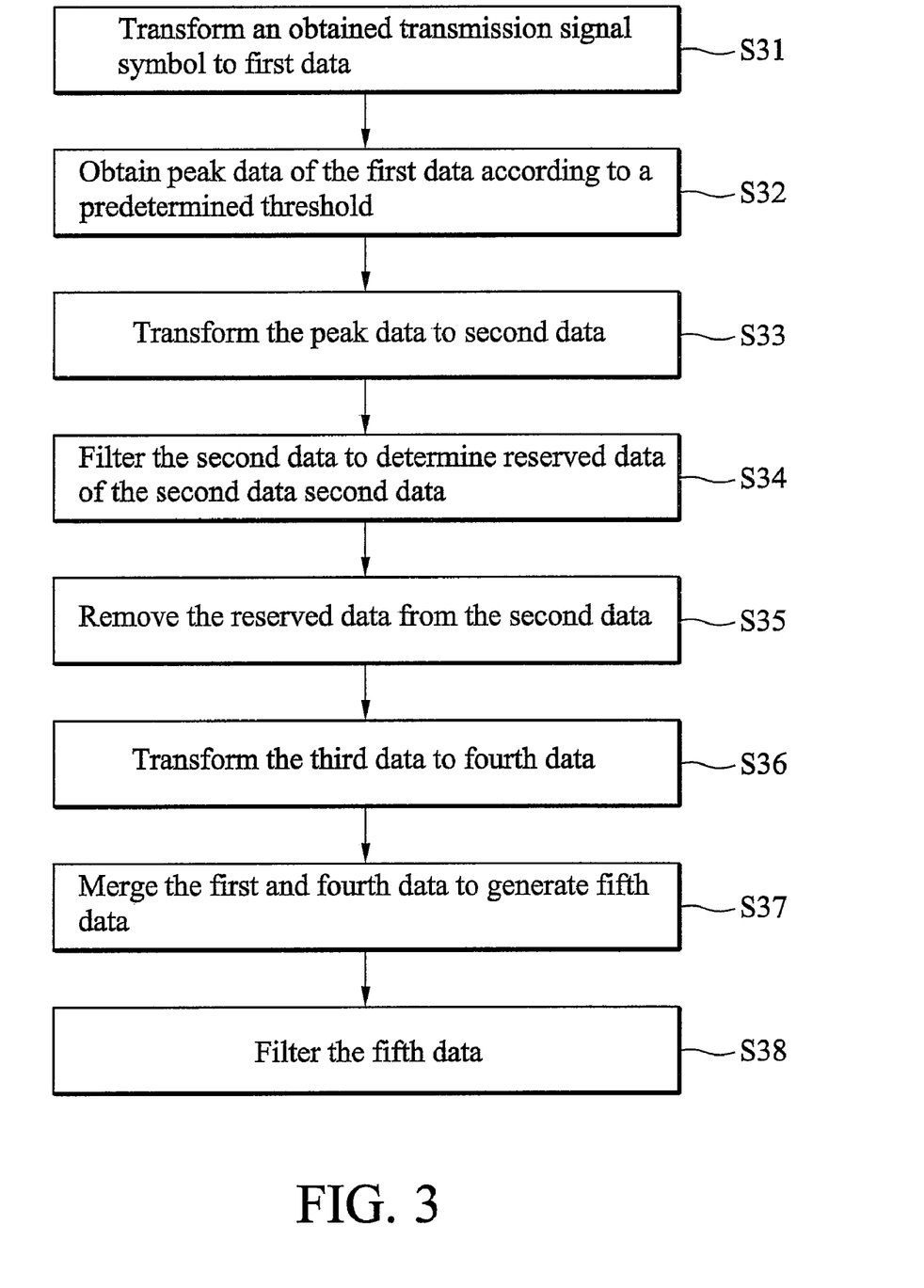
FIG. 3 is a flowchart of an embodiment of a data processing method capable of reducing required memory.

FIG. 3 is a flowchart of an embodiment of a data processing method capable of reducing required memory.

An obtained transmission signal symbol (an OFDM symbol) is transformed, for example an IFFT, to first data (indicating time domain data) and the first data is stored in a first memory buffer (step S31). Peak data is obtained based on the first data according to a predetermined threshold value (step S32). The peak data is transformed, for example a FFT) to second data (indicating frequency domain data) and the second data is stored in a second memory buffer (step S33). The second data is filtered, for example a spectrum masking) to determine reserved data of the second data (step S34). The reserved data is removed from the second data to generate third data (indicating time domain data) (step S35). The third data is transformed, for example an IFFT, to fourth data, for example time domain data, and the fourth data is stored in the second memory buffer (step S36). The first and fourth data are merged to generate fifth data (step S37). The fifth data is filtered, by, for example, a windowing operation, based on the transmission signal symbol and a previously obtained transmission signal symbol (step S38).

An embodiment of a data processing method and system can also be applied to wireless communication systems, transmitting devices, or wireless devices. A transmitting device comprises means for obtaining peak data based on the first data according to a predetermined threshold. An obtained transmission signal symbol is transformed to the first data and the first data is stored in a first memory buffer. Means for transforming, for example an FFT, the peak data to second data, for example a frequency domain data) and storing the second data in a second memory buffer. Means for filtering, for example a spectrum mask, the second data to determine reserved data of the second data. Means for removing the reserved data from the second data to generate third data, by, for example, a frequency domain data. Means for transforming, for example, an IFFT, the third data to fourth data, for example a time domain data, and storing the fourth data in a second memory buffer. Means for merging the first and fourth data to generate fifth data, and means for filtering the fifth data based on the transmission signal symbol and a previously obtained transmission signal symbol.

Figure 4:
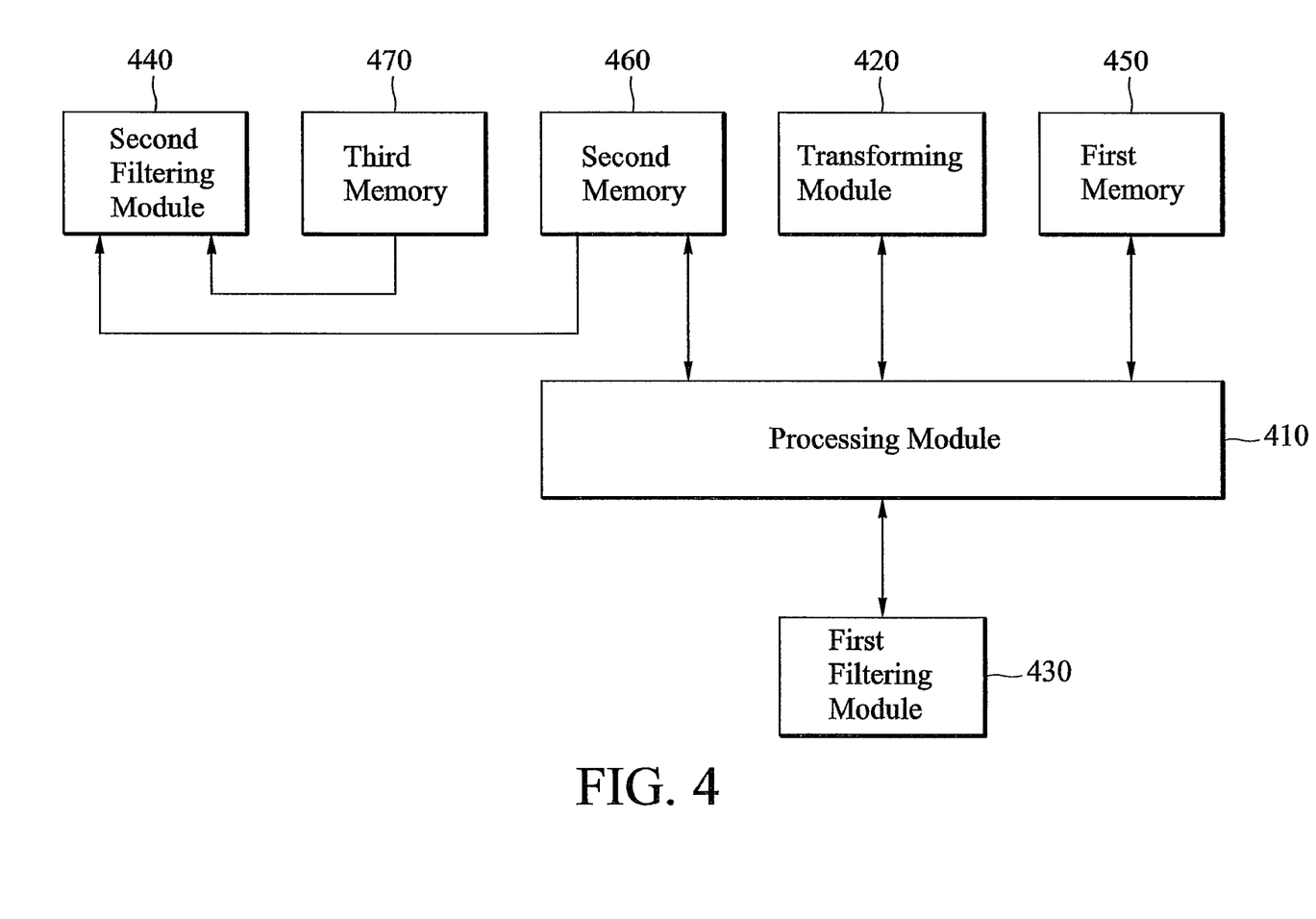
FIG. 4 is a schematic view of an embodiment of a wireless device.

FIG. 4 is a schematic view of an embodiment of a wireless device.

A wireless device comprises a processing module 410, a transforming module 420, a first filtering module 430, a second filtering module 440, a first memory 450, and a second memory 460, and a third memory 470. An obtained transmission signal symbol is first transformed to first data. First memory 450 stores the first data. Processing module 410 obtains peak data based on the first data according to a predetermined threshold. Transforming module 420 transforms the peak data to second data and stores the second data in second memory 460. First filtering module 430 filters the second data to determine reserved data of the second data and removes the reserved data from the second data to generate third data. Transforming module 420 transforms the third data to fourth data and stores the fourth data in second memory buffer 460. Processing module 410 merges the first and fourth data to generate fifth data. Second filtering module 440 filters the fifth data based on the transmission signal symbol and a previously obtained transmission signal symbol.

Figure 5:
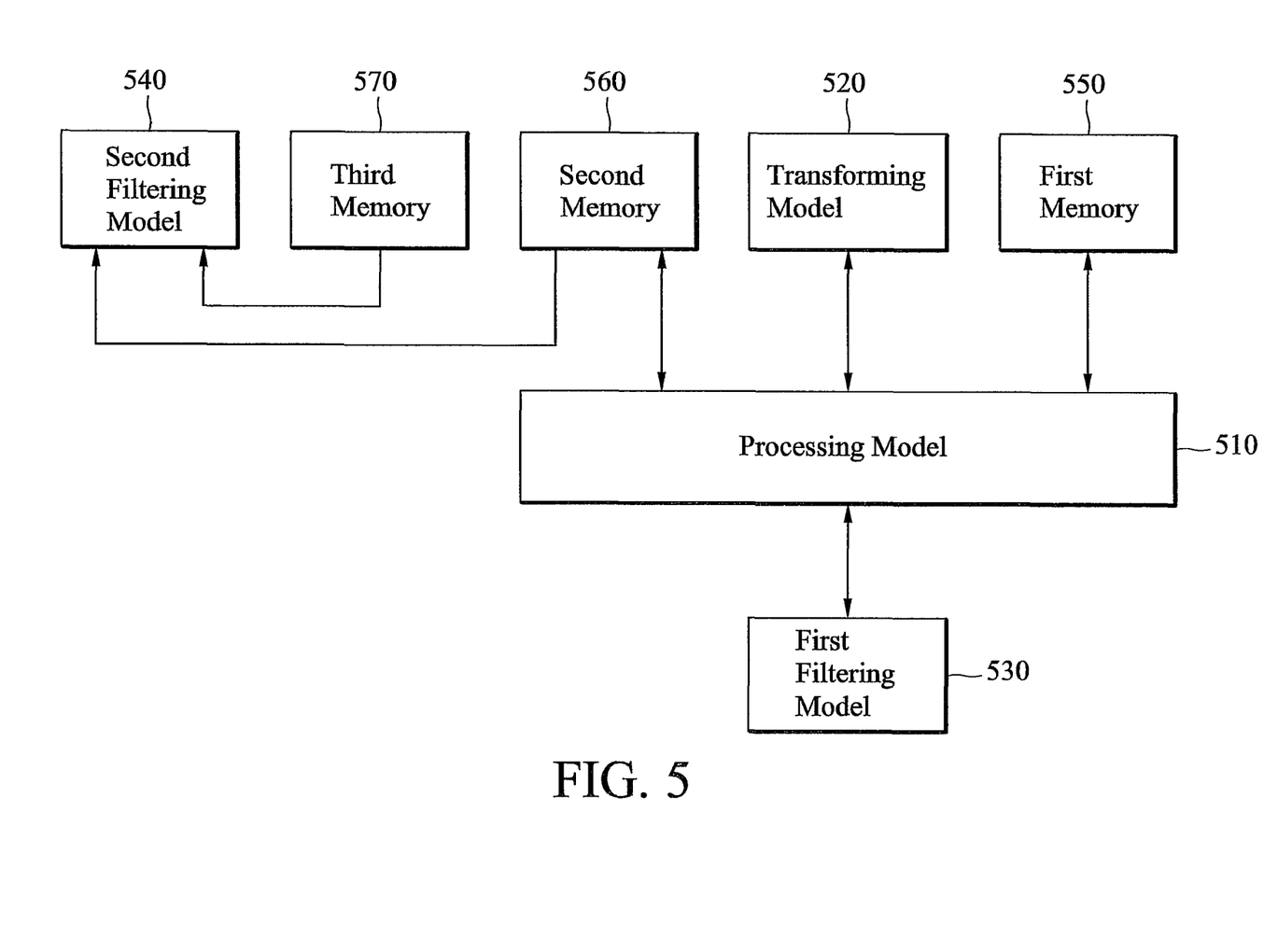
FIG. 5 is a schematic view of an embodiment of a wireless communication system.

FIG. 5 is a schematic view of an embodiment of a wireless communication system.

A wireless communication system comprises a processing model 510, a transforming model 520, a first filtering model 530, a second filtering model 540, a first memory 550, a second memory 560, and a third memory 570. An obtained transmission signal symbol is first transformed to first data. First memory 550 stores the first data. Processing model 510 obtains peak data based on the first data according to a predetermined threshold. Transforming model 520 transforms the peak data to second data and stores the second data in second memory 560. First filtering model 530 filters the second data to determine reserved data of the second data and removes the reserved data from the second data to generate third data. Transforming model 520 transforms the third data to fourth data and stores the fourth data in second memory 560. Processing model 510 merges the first and fourth data to generate fifth data. Second filtering model 540 filters the fifth data based on the transmission signal symbol and a previously obtained transmission signal symbol.

Methods and systems of the present disclosure, or certain aspects or portions of embodiments thereof, may take the form of program code (i.e., instructions) embodied in media, such as floppy diskettes, CD-ROMS, hard drives, firmware, or any other machine-readable storage medium, wherein, when the program code is loaded into and executed by a machine, such as a computer, the machine becomes an apparatus for practicing embodiments of the disclosure. The methods and apparatus of the present disclosure may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing and embodiment of the disclosure. When implemented on a general-purpose processor, the program code combines with the processor to provide a unique apparatus that operates analogously to specific logic circuits.

While the invention has been described by way of example and in terms of preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data processing method capable of reducing required memory, comprising:
    transforming an obtained transmission signal symbol to a frequency domain data;
    transforming the frequency domain data to first data and storing the first data in a first memory buffer;
    obtaining peak data based on the first data according to a predetermined threshold;
    transforming the peak data to second data and storing the second data in a second memory buffer;
    filtering the second data to determine reserved data of the second data;
    removing the reserved data from the second data to generate third data;
    transforming the third data to fourth data and storing the fourth data in a second memory buffer;
    merging the first and fourth data to generate fifth data; and
    filtering the fifth data based on the transmission signal symbol and a previously obtained transmission signal symbol,
    wherein the peak data is obtained by selecting at least one peak of the first data having a peak value greater than the predetermined threshold.

2. The data processing method capable of reducing required memory as claimed in claim 1, wherein the frequency domain data is transformed to the first data using inverse fast Fourier transform (IFFT).

3. The data processing method capable of reducing required memory as claimed in claim 1, wherein the first data is time domain data.

4. The data processing method capable of reducing required memory as claimed in claim 1, wherein the third data is transformed to the fourth data using IFFT.

5. The data processing method capable of reducing required memory as claimed in claim 1, wherein the third data is transformed to time domain data.

6. The data processing method capable of reducing required memory as claimed in claim 1, wherein filtering the fifth data based on the transmission signal symbol and the previously obtained transmission signal symbol is performed using a third memory buffer.

7. A data processing system capable of reducing required memory, comprising:
    a first memory buffer, storing first data;
    a second memory buffer;
    a third memory buffer;
    a processor, transforming an obtained transmission signal symbol to a frequency domain data, and obtaining peak data based on the first data according to a predetermined threshold;
    a transformer, transforming the frequency domain data to the first data and storing the first data in the first memory buffer, and transforming the peak data to second data and storing the second data in the second memory buffer;
    a first filter, filtering the second data to determine reserved data of the second data, and removing the reserved data from the second data to generate third data,
    wherein the transformer transforms the third data to fourth data and stores the fourth data in the second memory buffer and the processor merges the first and fourth data to generate fifth data; and
    a second filter, filtering the fifth data based on the transmission signal symbol and a previously obtained transmission signal symbol,
    wherein the processor obtains the peak data by selecting at least one peak of the first data having a peak value greater than the predetermined threshold.

8. The data processing system capable of reducing required memory as claimed in claim 7, wherein the transformer transforms the frequency domain data to the first data using IFFT.

9. The data processing system capable of reducing required memory as claimed in claim 7, wherein the first data is time domain data.

10. The data processing system capable of reducing required memory as claimed in claim 7, wherein the transformer transforms the third data to the fourth data using IFFT.

11. The data processing system capable of reducing required memory as claimed in claim 7, wherein the transformer transforms the third data to time domain data.

12. The data processing system capable of reducing required memory as claimed in claim 7, wherein the second filter filters the fifth data based on the transmission signal symbol and the previously obtained transmission signal symbol is performed using the third memory buffer.

13. A computer-readable storage medium storing a computer program providing a data processing method capable of reducing required memory, comprising using a computer to perform the steps of:

transforming an obtained transmission signal symbol to a frequency domain data;

transforming the frequency domain data to first data and storing the first data in a first memory buffer;

obtaining peak data based on the first data according to a predetermined threshold;

transforming the peak data to second data and storing the second data in a second memory buffer;

filtering the second data to determine reserved data of the second data;

removing the reserved data from the second data to generate third data;

transforming the third data to fourth data and storing the fourth data in a second memory buffer;

merging the first and fourth data to generate fifth data; and filtering the fifth data based on the transmission signal symbol and a previously obtained transmission signal symbol, wherein the peak data is obtained by selecting at least one peak of the first data having a peak value greater than the predetermined threshold.

14. A wireless device, comprising:

a first memory, storing first data;

a second memory;

a processing module, transforming an obtained transmission signal symbol to a frequency domain data, and obtaining peak data based on the first data according to a predetermined threshold;

a transforming module, transforming the frequency domain data to first data and storing the first data in the first memory buffer, and transforming the peak data to second data and storing the second data in the second memory;

a first filtering module, filtering the second data to determine reserved data of the second data, and removing the reserved data from the second data to generate third data, wherein the transforming module transforms the third data to fourth data, stores the fourth data in the second memory, and the processing module merges the first and fourth data to generate fifth data; and a second filtering module, filtering the fifth data based on the transmission signal symbol and a previously obtained transmission signal symbol, wherein the processing module obtains the peak data by selecting at least one peak of the first data having a peak value greater than the predetermined threshold.

15. A transmitting device, comprising:

means for transforming an orthogonal frequency division multiplexing (OFDM) symbol to first data and storing the first data in a first memory buffer;

means for obtaining peak data based on the first data according to a predetermined threshold;

means for transforming the peak data to second data and storing the second data in a second memory buffer;

means for filtering the second data to determine reserved data of the second data;

means for removing the reserved data from the second data to generate third data;

means for transforming the third data to fourth data and storing the fourth data in a second memory buffer;

means for merging the first and fourth data to generate fifth data; and means for filtering the fifth data based on the transmission signal symbol and a previously obtained transmission signal symbol, wherein means for obtaining peak data selects at least one peak of the first data having a peak value greater than the predetermined threshold as the peak data.

* * * * *